Jan. 3, 1967    M. U. DEVERILL    3,295,329
PORTABLE IRRIGATION DITCH GATE
Filed Jan. 21, 1964
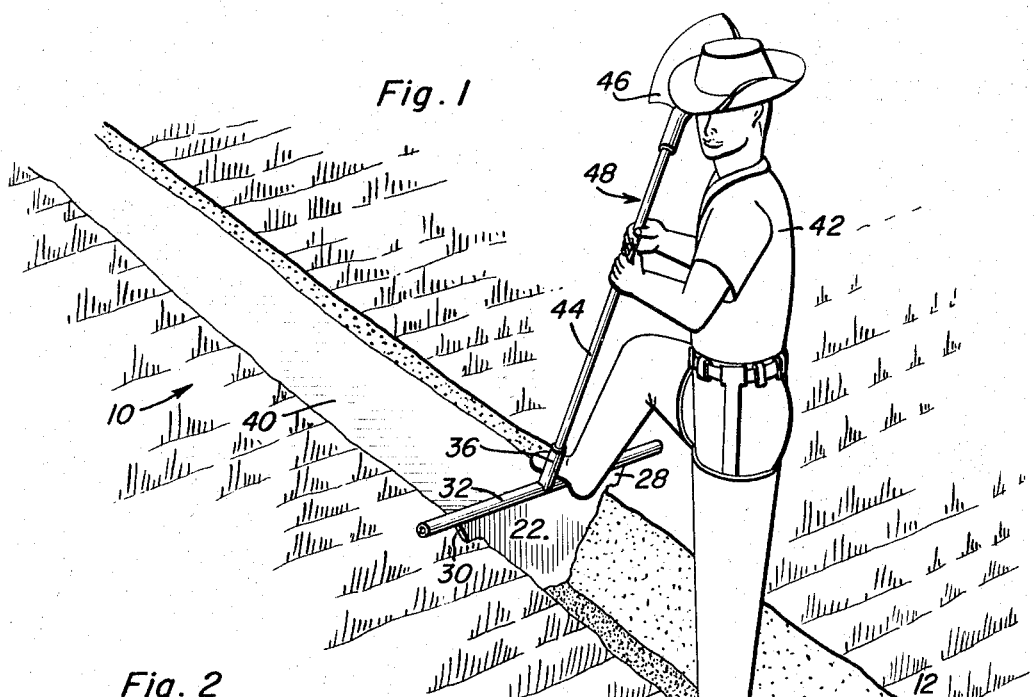
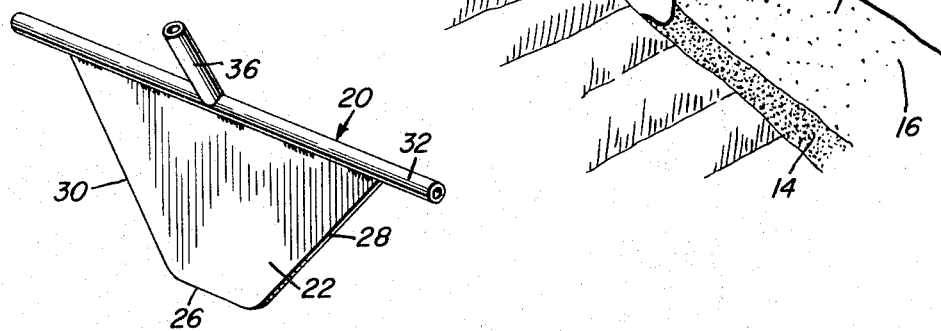
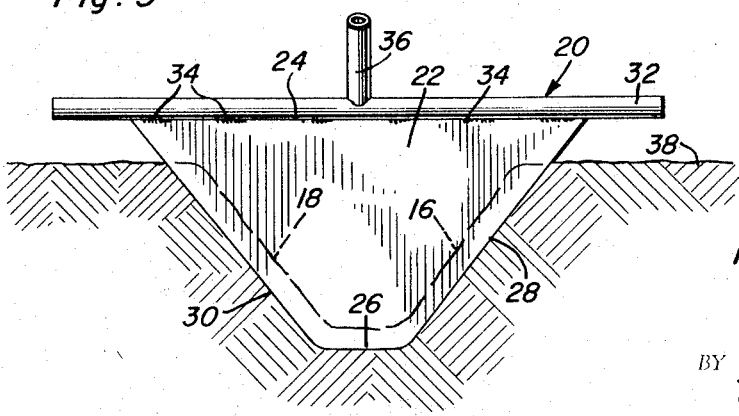
Maurice U. Deverill
INVENTOR.

3,295,329
PORTABLE IRRIGATION DITCH GATE
Maurice U. Deverill, P.O. Box 422,
Billings, Mont. 59103
Filed Jan. 21, 1964, Ser. No. 339,285
3 Claims. (Cl. 61—29)

This invention relates to a novel and useful portable irrigation ditch gate and more specifically to a portable irrigation ditch-forming member which may be utilized to form a temporary dam in an irrigation ditch.

The portable irrigation ditch gate of the instant invention includes a panel-like member which is generally isosceles trapezoidal in plan shape and which is adapted to be disposed with its shorter parallel side lowermost and lowered edgewise into an irrigation ditch or furrow with the panel-like member extending transversely of the ditch. The spacing between the parallel edges of the panel-like member is of a distance adapted to be greater than the depth of the ditch in which the ditch gate is disposed in order that the panel-like member may be lowered into the ditch with the equal upwardly diverging sides thereof disposed at an inclination so as to readily conform to the conventional downwardly convergent inclination of the opposite side of an irrigation ditch. In this manner, the shorter parallel side of the panel-like member and the oppositely inclined equal sides may simultaneously engage and penetrate the bottom and opposite side walls of the ditch.

The main object of this invention is to provide a portable irrigation ditch constructed in a manner whereby no special anchoring devices are needed to place the dam or ditch in an operative position and to maintain the gate in operative position.

Another object of this invention is to provide a ditch gate that may be placed in working position with a full head of water in the ditch.

Still another object of this invention is to provide a transversely extending bearing surface on the upper portion of the gate adapted to be engaged by the foot of the user and means whereby an upstanding handle may be defined so as to enable the irrigation ditch of the instant invention to be installed in the manner in which a shovel is forced into the ground.

Still another object of this invention is to provide a portable irrigation ditch gate which may be readily removed from a working position.

Still another object of this invention is to provide an irrigation ditch gate that may be readily used to form a dam in permanent-type ditches such as those used in pastures or in freshly plowed ditches or furrows such as may be found in grain fields.

Another object of this invention is to provide a portable irrigation ditch gate in accordance with the preceding objects which is of one piece construction and thereby more easily handled.

A final object of this invention to be specifically enumerated herein is to provide a portable irrigation ditch gate in accordance with the preceding objects which will conform to conventional forms of manufacture, be of simple construction and easy to use so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an irrigation ditch formed in a field and a workman shown in the process of installing the irrigation ditch gate of the instant invention within the irrigation ditch;

FIGURE 2 is a perspective view of the irrigation ditch gate shown on somewhat of an enlarged scale; and FIGURE 3 is a fragmentary sectional view taken through the ground defining the irrigation ditch and along a plane passing immediately in front of the gate illustrated in FIG. 1.

Referring now more specifically to the drawings the numeral 10 generally designates a conventional form of grain field or the like in which an irrigation ditch 12 has been formed. The irrigation ditch 12 includes a generally horizontal bottom 14 and downwardly convergent side walls 16 and 18.

The portable irrigation gate of the instant invention is generally referred to by the reference numeral 20 and includes a generally panel-like member 22 which is generally isosceles trapezoidal in plan shape including long and short parallel side edges 24 and 26 and downwardly convergent equal length side edges 28 and 30.

The edges 26, 28 and 30 are sharpened and an elongated tubular reinforcing member 32 is secured to the upper edge 24 of the panel-like member 22 in any convenient manner such as by welding at locations 34 on one side of the panel-like member and similar welding locations (not shown) disposed between the welding locations 34 and on the other side of the panel-like member remote from the locations 34.

An upstanding tubular socket 36 is secured by welding (not shown) to the approximate mid-portion of the elongated reinforcing member 32 and it may be seen from FIGURES 1 and 2 of the drawings that the socket 36 is inclined relative to the panel-like member 22 so that its upper end projects away from the plane in which the panel-like member 22 is disposed.

The distance between the parallel edges 24 and 26 is sufficient to enable the lower edge 26 to engage the bottom wall 14 of the ditch 12 while the elongated reinforcing member 32 is spaced above the upper surface 38 of the field 10. It is to be further noted that the inclination of the equal length sides 28 and 30 conforms to the inclination of the opposite side walls 16 and 18 of the ditch 12 and that the edge 26 is of a length greater than the width of the bottom wall 14 of the ditch 12. In this manner, it may be seen that the panel-like member 22 may be disposed within the ditch 12 in the manner illustrated in FIGURE 3 of the drawings with the panel-like member penetrating the walls 14, 16, and 18 of the ditch 12 and forming a complete dam thereacross to hold back the water 40 in one end of the ditch 12 (see FIGURE 1).

In operation, the workman 42 may take the end of the handle 44 remote from the blade portion 46 of the shovel generally referred to by the reference numeral 48 and insert the handle 44 into the socket 36 with the lower end of the inverted handle 44 seating against the elongated bracing member 32. In this manner a shovel-like apparatus is formed and the workman 42 may place one foot on the elongated reinforcing member so as to bear down upon the latter while steadying the gate 20 with his hands on the upper portion of the inverted handle 44. After sufficient downward pressure has been applied to the reinforcing member 32, the handle 44 may be removed and the gate 20 will be operatively secured within the ditch 12.

While the gate 20 is illustrated in FIGURE 3 of the drawings operatively secured within the ditch 12 with the reinforcing member 32 spaced above the upper surface 38, it is to be understood that further downward pressure could be applied to the reinforcing member 32 if desired in order to force the panel-like member 22 further into the ground until the reinforcing member 32 rests upon the upper surface 38.

When it is desired to remove the gate 20, the handle 44 may be inserted within the reinforcing member, and with upward prying action, the gate 20 may be loosened from its working position and lifted out of the ditch 12 by grasping the handle-forming socket 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable irrigation ditch gate for defining a temporary dam in an irrigation ditch including downwardly included side walls, said gate comprising an imperforate panel-like member generally isosceles trapezoidal in plan shape and having an elongated reinforcing member welded rigidly to and extending along the longer of the parallel edges of said panel-like member and projecting outwardly beyond the equal length edges of said panel-like member, the spacing between the parallel edges of said panel-like member being a distance adapted to be greater than the depth of said ditch whereby when said panel-like member is lowered edgewise into said ditch the shorter of the parallel edges will engage and penetrate the bottom of said ditch as said equal length edges penetrate the side walls of said ditch before said reinforcing member engages the upper surface of the ground on opposite sides of the ditch as said panel-like member is forced downwardly into the ground defining said ditch, said reinforcing member including an upstanding upwardly opening tubular socket disposed intermediate its opposite ends and which projects away from said panel-like member along a line inclined slightly away from the plane in which said panel-like member is disposed, and a removable elongated handling having one end snugly telescoped in said socket.

2. The combination of claim 1 wherein the distance between said parallel edges equals approximately one-half the length of the longer of the parallel edges of said panel-like member.

3. The combination of claim 1 wherein the shorter of the parallel edges and the equal length edges of said panel-like member are sharpened.

References Cited by the Examiner
UNITED STATES PATENTS

| | | | |
|---|---|---|---|
| 731,077 | 6/1903 | Smith | 61—29 |
| 1,370,296 | 3/1921 | Edwards | 61—29 |
| 1,378,342 | 5/1921 | Freudenberg | 61—29 |
| 1,404,325 | 1/1922 | Schaeffer | 61—29 |
| 1,843,797 | 2/1932 | Beaty et al. | 61—29 |
| 1,968,743 | 7/1934 | Christoffersen | 61—29 |

FOREIGN PATENTS

| | | |
|---|---|---|
| 557,821 | 2/1957 | Italy. |

EARL J. WITMER, *Primary Examiner.*